Sept. 9, 1947.  H. V. ALLISON  2,427,085

CHUCK AND ABRASIVE DRILL

Filed May 7, 1946

INVENTOR
HUGH V. ALLISON
BY
*Joseph T. Hanrahan*
ATTORNEY

Patented Sept. 9, 1947

2,427,085

UNITED STATES PATENT OFFICE 2,427,085

CHUCK AND ABRASIVE DRILL

Hugh V. Allison, Fairfield, Conn.

Application May 7, 1946, Serial No. 667,804

6 Claims. (Cl. 125—20)

1

This invention relates to new and useful improvements in abrasive cutting and has particular relation to a chuck for holding an abrasive tube drill.

An object of the invention is to provide a simple and inexpensive chuck especially adapted for use with an abrasive tube drill and which chuck includes means whereby an abrasive tube drill may be easily and quickly mounted, is properly supported, and may be easily and quickly removed.

Other objects and advantages of the invention will become apparent from a consideration of the following detailed description taken in connection with the accompanying drawing wherein a satisfactory embodiment of the invention is shown. However, it is to be understood that the invention is not limited to the details disclosed but includes all such variations and modifications as fall within the spirit of the invention and the scope of the appended claims.

In the drawing:

Fig. 2 is a central vertical sectional view through the assembly of Fig. 1 but showing the drill as partly cut through a piece of glass, or the like;

Figure 1:
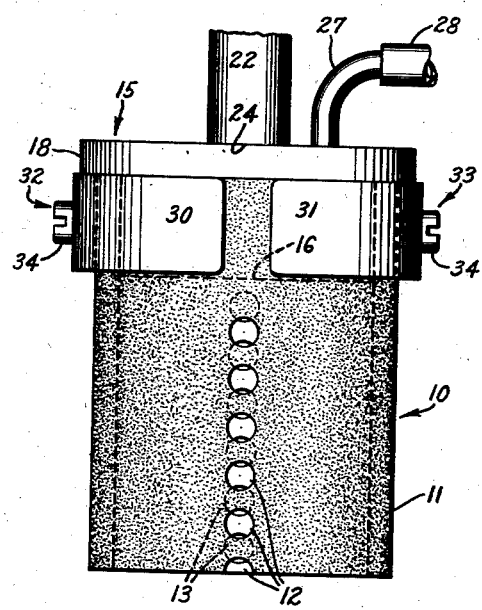
Fig. 1 is a side elevational view showing the chuck of the invention mounting an abrasive tube drill.

Referring in detail to the drawing, at 10 is generally indicated an abrasive tube drill of abrasive grain and a bonding medium and which may be of the construction or general type disclosed in my Patent No. 2,368,397 issued January 30, 1945. This drill comprises a tubular body 11 of the desired diameter, length and wall thickness, and in such body at opposite sides thereof are rows, 12 and 13 respectively, of perforations or openings. The openings of each row are spaced apart from one another and the openings of one row are alternate with respect to those of the other row. That is, the openings in one row are for the most part opposite the spaces between the openings of the other row.

However, the openings are of such diameter and are so spaced that as between the two rows they slightly overlap so that at all times one opening is broken through the leading edge of the drill whereby there is always a notch in such edge of

2 the drill. Actually the drill is of a relatively thin wall construction so as to reduce to a minimum the work involved in passing the drill through an object and also to reduce to a minimum the waste involved in the amount of material removed in passing the drill through an object. Additionally, opening through the upper end portion of the drill body 11, preferably at diametrically opposite sides thereof, are a pair of notches 14 used in mounting the drill on the chuck now to be described.

The improved chuck, generally designated 15, comprises an annular body 16 including a relatively heavy bottom wall 17 and at its upper end an annular flange-like portion 18. Opening through the inner peripheral edge and the upper side of the flange 18 is an annular recess 19 receiving the outer edge portion of a gasket or closure 20. When such gasket is in place, it together with the upper surface of the wall 17 defines a chamber 21, the purpose of which will be set forth.

Gasket 20, as is the body 16, is of metal and does not have a tight or rigid fit in the recess 19 but is adapted to remain stationary when the body 16 is rotated during use of the drill. A shank 22 has a portion 23 of reduced diameter whereby a shoulder 24 is formed and when the shank is in place this shoulder is against, or substantially against, the upper central portion of the gasket 20 and maintains the same with its outer peripheral edge in the recess 19.

The lower end portion of the shank 22 is threaded, as at 25, into a tapped opening provided centrally in the wall 17. Such threaded end portion of the shank may be of less diameter than the shank portion 23 whereby a shoulder 26 is formed to engage the upper surface of the wall 17 and limit threading movement of the shank into such wall. This will serve to prevent the shoulder 24 of the shank wedging down against the gasket 20 in such a manner as to bind the latter to the body 16. The threaded connection between the shank 22 and the body 16 is preferably made in such manner that when the shank is driven to drive the body the threaded connection tends to tighten.

Shank 22 is adapted to be received in any suitable holder or chuck of a suitable machine, as a machine in the nature of a drill press, wherein the drill 10 is to be used. A tube 27 is connected through the gasket 20 and may have a hose or other connection 28 whereby water or other coolant is supplied to the tube and passes through the latter into the chamber 21. From this chamber the water or other coolant passes through openings 29, in the wall 17, to the interior of the drill body 11.

Similar clamps 30 and 31 are mounted on the body 16 for use in securing the drill 10 thereto. As shown, these clamps are formed of arcuate pieces whereby when they are drawn against a portion of the drill a substantial area of the latter will be engaged. The clamps are mounted and are adapted to be moved to and from clamping positions by means of screw-like devices 32 and 33. Such devices 32 and 33 each include a head 34, a smooth shank portion 35 passing through its clamp, a shoulder or flange portion 36 at the inner side of its clamp and, beyond such flange or shoulder, a threaded shank 37 engaging with a tapped opening in the body 16.

Flanges or shoulders 36 are of a thickness less than the wall thickness of the drill to be held and provide means whereby as the devices are turned in one way to thread their shanks 37 out of the body 16 the clamps are moved away from the body. When the devices are turned in the opposite direction their shanks are threaded into the body and their heads move their clamps toward the body.

In the use of the chuck a drill 10 has its upper end slipped over the body 16 of the chuck so as to have its notches 14 receive the portions of devices 32 and 33 at the inner sides of the respective clamps 30 and 31. It will be understood that the clamps need never be detached from the chuck body but that they are simply loosened to permit of the end of the drill being slipped over the body 16 or to be removed from such body. The end portion of the drill being in place, such end portion is internally supported by the chuck body 16. Thereafter on tightening of the devices 32 and 33 the clamps 30 and 31 are drawn against the outer sides of such end portion of the drill tightly clamping the same in place.

At this time it will be assumed that the shank 22 is connected with the driving chuck or the like and that hose 28 is connected with a suitable supply of coolant. As the shank 22 is driven, the chuck body 16, together with the tube drill 10 and the clamps, is rotated and the coolant is supplied by the tube 27 to the chamber 21 and through the openings 29 to the interior of the drill.

Figure 2:
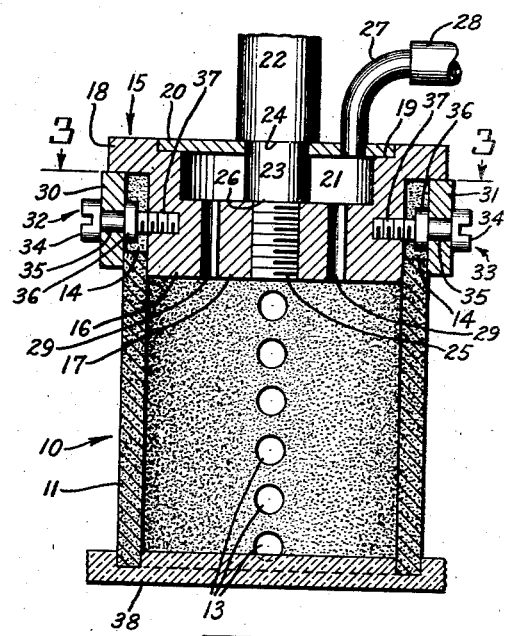
Figure 3:
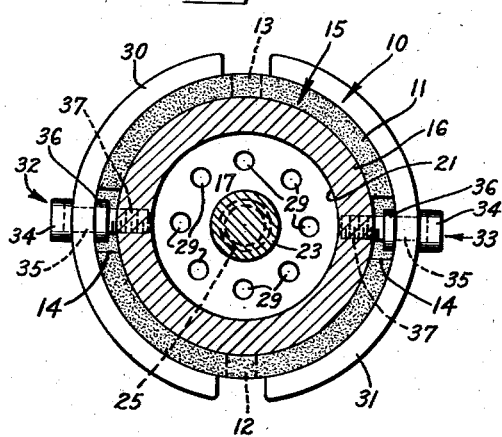
Fig. 3 is a horizontal sectional view through the complete chuck and tube drill; the view being taken as along the plane of the line 3—3 of Fig. 2.
Figure 4:
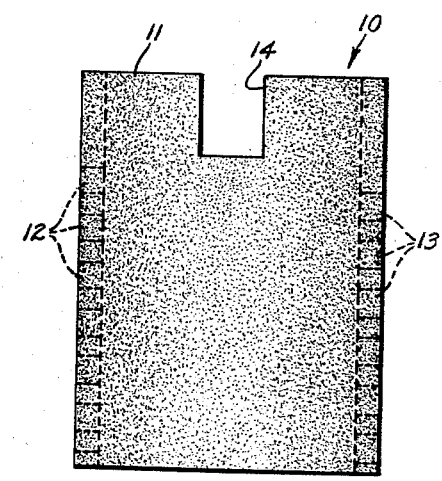
Fig. 4 is a side elevational view of the abrasive tube drill, the view being taken at right angles to Fig. 1.
Figure 5:
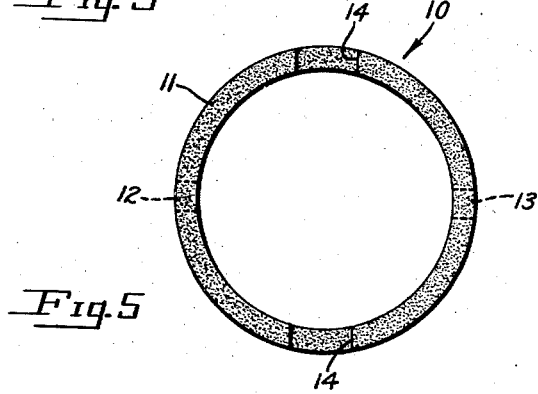
Fig. 5 is a top plan view of the drill of Fig. 4.

As the drill moves down through the work, for example—through a piece of glass 38 in Fig. 2—the coolant is plentifully supplied and is sprayed against the inner walls of the drill. Some of the coolant washes under the leading edge of the drill and serves to wash out of the cut being made the abraded material from the work, together with other debris comprising worn away portions of the drill. Additionally, some of this coolant passes out through the openings 12 and 13 in the side walls of the drill. As the drill rotates and enters the work the lowermost of such openings 12 and 13 also carries additional coolant into the cut being made.

From the foregoing description taken in connection with the drawing, it will be seen that I have provided a simple and inexpensive construction of chuck for holding abrasive tube drills. The chuck includes only the body 16, shank 22, gasket 20 and clamps 30 and 31. Each of these parts is of simple and rugged construction. These parts are easily formed and none of them contain any structure likely to get out of order. There are no adjustable parts and no adjustments to be made.

When a worn drill is to be removed the devices 32 and 33 are simply backed off slightly to shift the clamps 30 and 31 out from clamping relation with the upper end portion of the drill and then such portion is removed. A new drill has its upper end portion slipped into place and the devices 32 and 33 are tightened to secure the clamps 30 and 31 against such end portion of the new drill.

It is noted that the clamps 30 and 31 are so designed as to engage the outer surface of the upper end portion of the drill over a relatively large area so that there is little, if any, likelihood that the drill will be fractured or cracked in the mounting operation. Further, the drill being held over this wide area, there is little, if any, likelihood of the drill being sheared off in use.

It will be understood that chucks of various sizes will be provided for the various sizes of drills used since each chuck is made with the outer diameter of its body 16 to receive a drill or drills of a given internal diameter. In this way adjustments are avoided and yet the inner surface of the upper end portion of each drill is uniformly supported over its entire area.

Additionally, the clamps 30 and 31 are made on an arc or radius so that they engage, between them, substantially the entire outer surface of the upper end portion of the drill. An ample supply of coolant is furnished through the tube 17 so that there is actually a flood of coolant to the inner surface of the drill and such coolant works out under the leading edge of the drill and through the side openings 12 and 13. The coolant working under the leading edge of the drill washes away all chips or other debris so that a clean, sharp cutting end is presented at all times to the work. There is some leakage of coolant about the gasket 20 but this is immaterial since it will be understood that when the drill is in operation a splash guard (not shown) is in place about the drill.

Having thus set forth the nature of my invention, what I claim is:

1. In a chuck for abrasive tube drills, a rotatable body including an annular outer wall and a bottom wall, a mounting and rotating shank detachably connected with said bottom wall, a gasket rotatable with and closing the upper end of said body and having an opening therethrough for the passage of a coolant to the interior of the body, said bottom wall of the body having openings therethrough for the passage of a coolant, and clamping means carried by said body and disposed beyond the outer sides of said annular wall.

2. In a chuck for an abrasive tube drill, a body including an outer annular surface and a bottom wall, said body having an annular recess opening through its inner periphery and its upper side, a gasket having its outer peripheral portion seated in said recess, said gasket having an opening therein for the passage of a coolant, a shank passing through said gasket and threaded into said bottom wall, said shank having a shoulder thereon engaging and maintaining said gasket in place, said bottom wall having openings therethrough for the passage of a coolant, and clamping means at the outer sides of said annular surface of the body and carried by the latter.

3. In a chuck for an abrasive tube drill, a fixed diameter body having an annular outer surface, a pair of arcuate clamps, a screw device rotatable relative to each of said clamps and threaded into said body, shoulders on said screw devices at the inner sides of said clamps whereby on turning of the devices in one direction the clamps are moved toward the body and on turning the devices in the opposite direction the clamps are moved outwardly radially with respect to the body, a radially extending portion on said body at the upper end of said wall to limit telescoping movement of the body and a tube drill, and said radially extending portion of greater thickness than the tube drill and serving to prevent turning movements of said clamps on said screw devices.

4. In a chuck for an abrasive tube drill, a fixed diameter hollow body having a perforated bottom wall and an annular outer surface, a gasket over the upper end of said body, a shank passing through said gasket and attached to the bottom wall of said body, said shank including a portion engaging said gasket and holding the same on the body, means for supplying a coolant to the interior of said body through said gasket, clamps at the outer side of said body, and means for moving said clamps toward and from the body.

5. In a chuck for an abrasive tube drill, a fixed diameter hollow body having a perforated bottom wall and an annular outer surface, a gasket over the upper end of said body, a shank passing through said gasket and attached to the bottom wall of said body, said shank including a portion engaging said gasket and holding the same on the body, means for supplying a coolant to the interior of said body through said gasket, a pair of arcuate clamps, a screw device rotatable relative to each of said clamps and threaded into said body, and shoulders on said screw devices at the inner sides of said clamps whereby on turning of the devices in one direction the clamps are moved toward the body and on turning the devices in the opposite direction the clamps are moved outwardly radially with respect to the body.

6. In a chuck for abrasive tool drills, a body of fixed diameter having an annular outer wall adapted to have the end portion of a tube drill slipped thereover, a radially extending portion on said body at the upper end of said wall to limit telescoping movement of the body and a tube drill, clamping means carried by said body and movable inwardly and outwardly radially relative thereto and adapted to cooperate with said annular wall in the clamping of the end portion of a drill slipped over said wall, and said radially extending portion engaged by and limiting said clamping means to radial movements only relative to said body.

HUGH V. ALLISON.

REFERENCES CITED

The following references are of record in the file of this patent:

UNITED STATES PATENTS

| Number | Name | Date |
|---|---|---|
| 648,955 | Hendricks et al. | May 8, 1900 |
| 743,308 | Messer | Nov. 3, 1903 |
| 2,023,041 | Ballash et al. | Dec. 3, 1935 |
| 137,435 | Gillespie | Apr. 1, 1873 |
| 1,772,001 | Hall et al. | Aug. 5, 1930 |
| 1,825,277 | Lytle | Sept. 29, 1931 |
| 639,955 | Warner | Dec. 26, 1899 |